(12) United States Patent
Shoup

(10) Patent No.: US 8,479,671 B2
(45) Date of Patent: Jul. 9, 2013

(54) MAGNETIC VACUUM SEED METER

(76) Inventor: David T. Shoup, Bonfield, IL (US)

( * ) Notice: Subject to any disclaimer, the term of this patent is extended or adjusted under 35 U.S.C. 154(b) by 280 days.

(21) Appl. No.: 12/807,204

(22) Filed: Aug. 30, 2010

(65) Prior Publication Data
US 2012/0048161 A1    Mar. 1, 2012

(51) Int. Cl.
*A01C 7/046*    (2006.01)
*A01C 7/125*    (2006.01)
*A01C 7/128*    (2006.01)

(52) U.S. Cl.
USPC ........................................................ 111/185

(58) Field of Classification Search
USPC .................................. 111/200, 900, 177–185
See application file for complete search history.

(56) References Cited

U.S. PATENT DOCUMENTS

| | | | |
|---|---|---|---|
| 2,675,942 A | * | 4/1954 | Vogelsang .................... 221/212 |
| 4,300,462 A | * | 11/1981 | Wilkins et al. .................. 111/91 |
| 4,793,511 A | | 12/1988 | Ankum et al. |
| 5,170,909 A | | 12/1992 | Lundie et al. |
| 5,740,747 A | | 4/1998 | Stufflebeam et al. |
| 6,401,638 B1 | | 6/2002 | Crabb et al. |
| 6,516,733 B1 | | 2/2003 | Sauder et al. |

* cited by examiner

*Primary Examiner* — Christopher J Novosad
(74) *Attorney, Agent, or Firm* — Olson & Cepuritis, Ltd.

(57) ABSTRACT

A seed meter for an agricultural seed planter, wherein the seed meter includes a rotatable disk assembly for a seed meter to dispense individual seeds at desired intervals. The rotatable disk comprises a seed disk including a plurality of circumferentially spaced seed apertures about the periphery operatively connected to a vacuum source, a substantially nonmagnetic backing disk member having a plurality of vacuum apertures and also in communication with the vacuum source, a resilient disk member adjacent and engageable with the nonmagnetic backing disk comprising a plurality of magnetic portions engageable with a magnetic source and adapted to occlude the seed aperture and disrupt communication with the vacuum source. The seed disk, substantially nonmagnetic backing disk member and resilient disk member are also rotatably mounted within a housing on a conduit. The vacuum source is operatively connected to the inside of the housing.

18 Claims, 8 Drawing Sheets

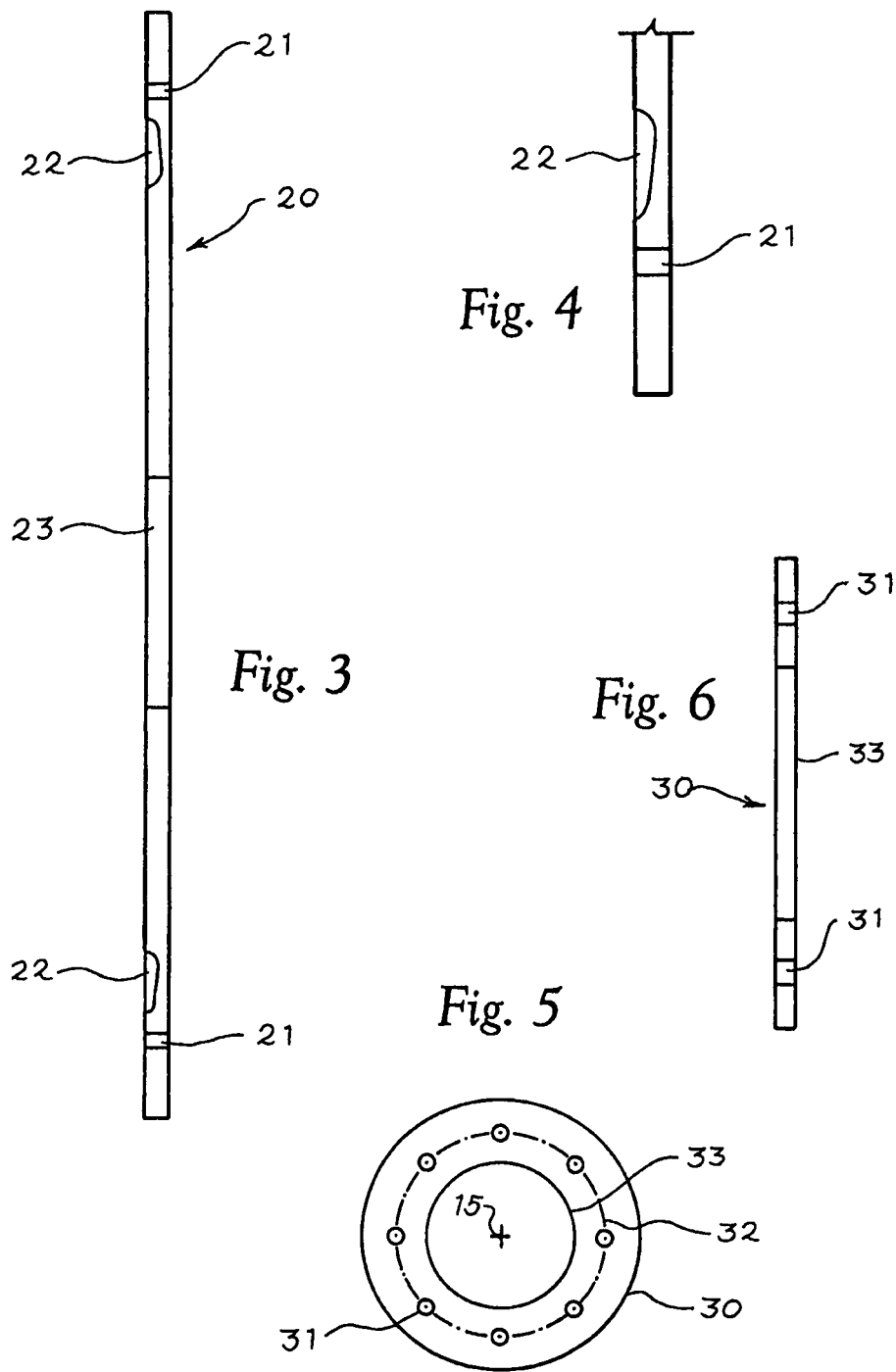

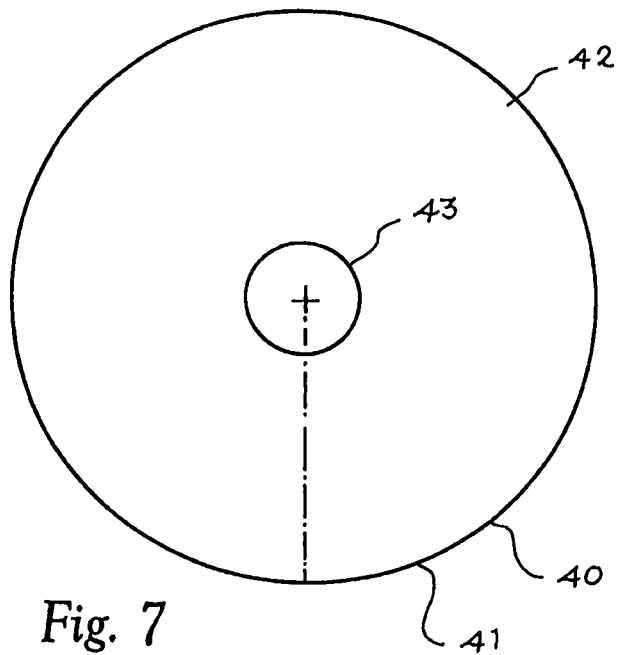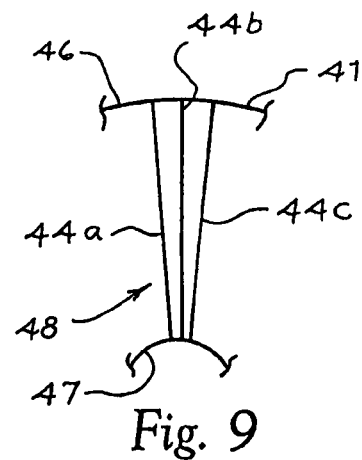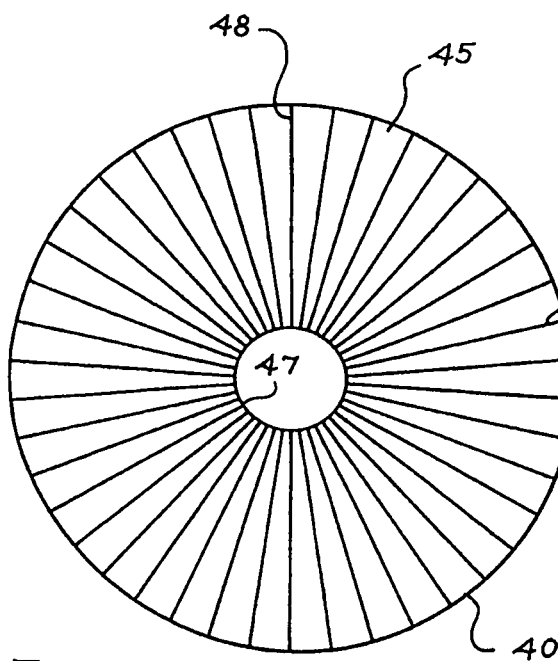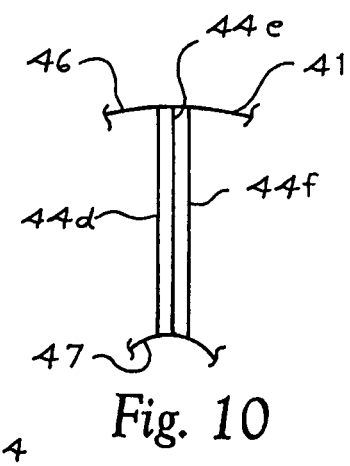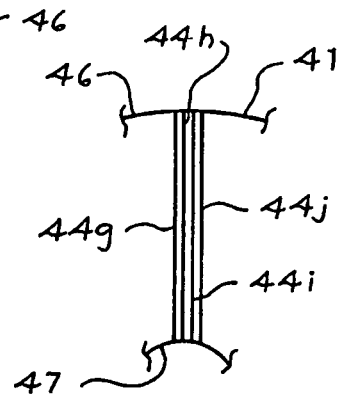
Fig. 7
Fig. 8
Fig. 9
Fig. 10
Fig. 11

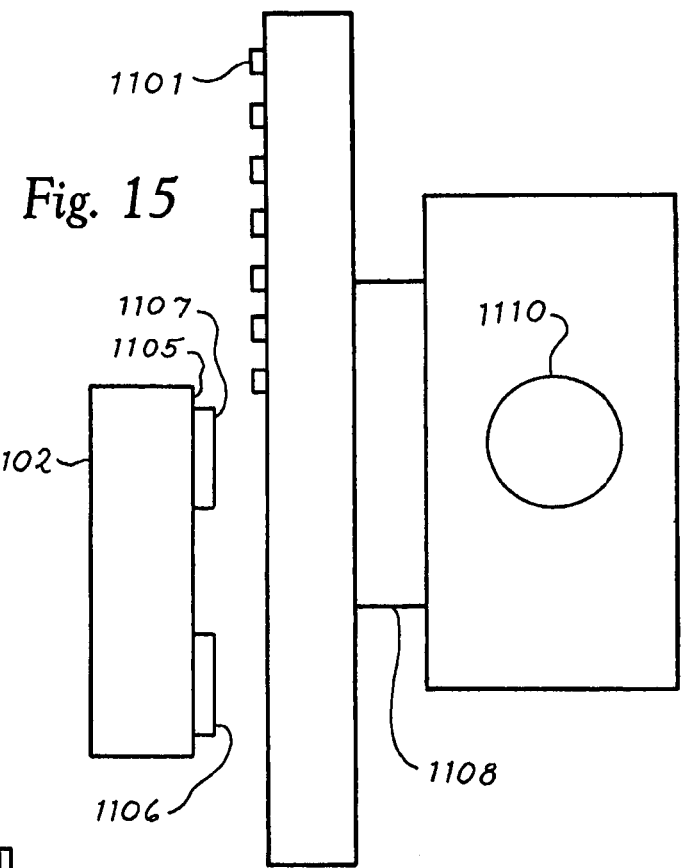
Fig. 15
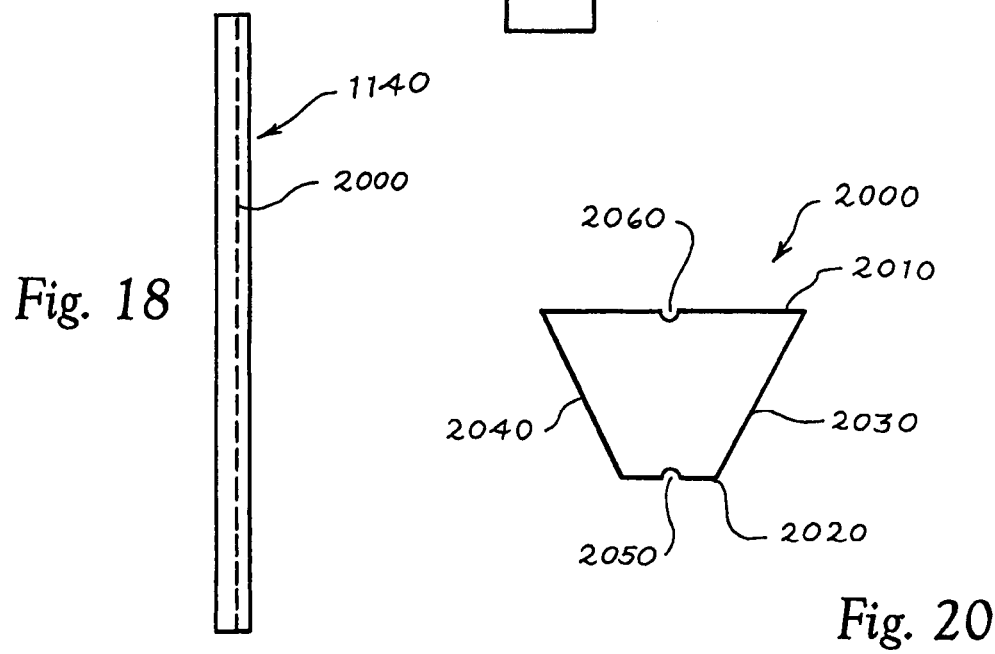
Fig. 18
Fig. 20

US 8,479,671 B2

MAGNETIC VACUUM SEED METER

FIELD OF THE INVENTION

The present invention generally relates to seed metering mechanisms for dispensing individual seeds at a controlled rate into a seed furrow as the seed meter is advanced above and along the furrow and, more particularly, to a vacuum seed metering mechanism including a magnetic apparatus for separating the seeds from the vacuum seed meter.

BACKGROUND OF THE INVENTION

The precise planting of seeds is essential for achieving a field's maximum crop yield potential and profitability. Numerous agricultural planters are known in the art which utilize various types of seed metering devices designed to select and dispense individual seeds at desired intervals.

The most common types of seed meters being employed today are mechanical and vacuum seed meters. Mechanical seed meters typically removably secure the seeds to the meter through finger-like projections. Vacuum meters usually apply a vacuum to one side of a rotating disk containing concentric circular apertures thereby creating a negative pressure on the opposite sides of the disk. Vacuum seed meters are somewhat preferable to mechanical seed meters because they typically include fewer parts. With fewer parts, the farmer does not have as much to maintain and unsuccessful seed release due to a part failure is decreased.

Despite some of the advantages of vacuum seed meters, various reliability issues exist with the current vacuum seed meters. For example, the strong vacuum pressure typically required to sufficiently hold the seed within the aperture of the seed disk can result in the seeds not being timely discharged or smaller seeds or portions becoming lodged in the apertures.

A lack of proper maintenance of the seed meter or a farmer's failure to use the correct seed meter for a particular application contributes to the skipping or multiple dropping of individual seeds. Therefore, it would be advantageous to provide a vacuum seed meter device which requires little maintenance on the part of the farmer yet readily and timely discharges the seeds from the seed metering device.

SUMMARY OF THE INVENTION

The present invention provides a vacuum seed meter that includes a rotatable disk assembly for a seed meter to dispense individual seeds at desired intervals.

The rotatable disk includes a housing comprising a seed disk and defining an interior portion, the interior portion of the housing being in operable communication with a vacuum source. The seed disk includes a plurality of circumferentially spaced seed apertures about a periphery thereof, wherein the plurality of seed apertures is operatively connected to the vacuum source.

Also included as part of the rotatable disk assembly is a substantially nonmagnetic backing disk member disposed within the housing and in communication with the vacuum source and defining a plurality of vacuum apertures on a first surface thereof.

The rotatable disk assembly further comprises a resilient disk member adjacent to and engaging the backing disk at the first surface. The resilient disk member includes a plurality of magnetic portions wherein at least one of the plurality of magnetic portions is engageable with at least one of the plurality of spaced seed apertures of the seed disk when engaged with a magnetic source. Each of at least one of the plurality of magnetic portions is adapted to occlude the seed aperture and to disrupt communication between the at least one seed aperture and the vacuum source.

BRIEF DESCRIPTION OF THE DRAWINGS

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

FIG. 3 is a side view of the seed disk of FIG. 2;

FIG. 4 is a side view of an enlarged portion of the seed disk of FIG. 2;

FIG. 5 is a front view of a face plate of the seed meter assembly of FIG. 1;

FIG. 6 is a side view of the face plate of FIG. 5;

FIG. 7 is a front view of a resilient disk member of the seed meter assembly of FIG. 1;

FIG. 8 is front view of an internal portion of the resilient disk member of FIG. 7;

FIG. 9 is an enlarged view of a portion of one embodiment of the resilient disk member of FIG. 7;

FIG. 10 is an enlarged view of a portion of one embodiment of the resilient disk member of FIG. 7;

FIG. 11 is an enlarged view of a portion of one embodiment of the resilient disk member of FIG. 7;

FIG. 15 is a side view of the seed meter assembly of FIG. 14;

FIG. 18 is a side view of the resilient disk member of FIG. 17;

FIG. 20 is a front view of a substantially magnetic portion associated with the seed meter assembly.

DETAILED DESCRIPTION OF THE INVENTION

While particular embodiments of the present invention have been shown and described, it will be appreciated by those skilled in the art that changes, modifications and improvements may be made without departing from the true spirit and scope of the invention.

Figure 1:
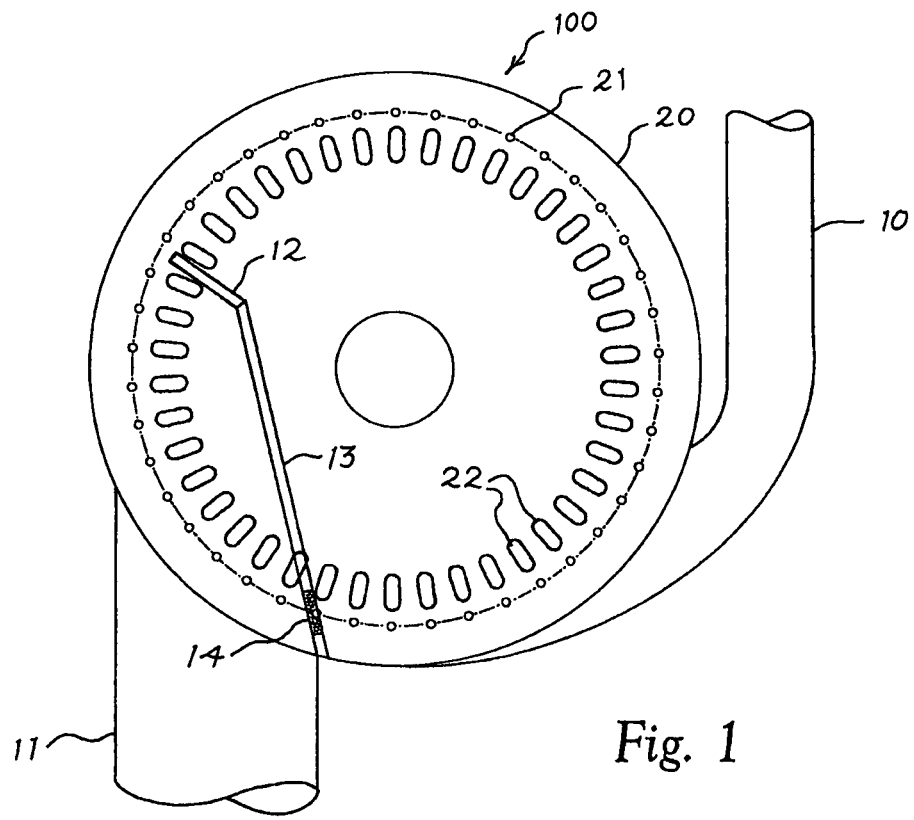
FIG. 1 is a schematic front elevational view of a vacuum seed meter in accordance with a preferred embodiment of the invention.

Shown in FIG. 1 is a schematic front elevational view of a vacuum first seed meter assembly 100 in accordance with a preferred embodiment of the invention. First seed meter assembly 100 is designed to be used in association with a variety of different planting units, which include a seed hopper and furrow. Seed meter assembly 100 may have a housing 60 which includes a seed disk 20, a face plate 30, a resilient disk 40, and a nonmagnetic backing disk 50. During use, first seed meter assembly 100 rotates about a central axis 15. Simultaneously, seeds may be dropped from a furrow through a seed inlet 10. As the seed meter assembly 100 rotates, a vacuum is created within inner chamber 70 thereby causing a pressure difference between inner chamber 70 and the exterior of seed disk 20. This pressure difference urges the individual seeds against a plurality of seed apertures 21. As seed disk 20 travels past magnet 14 located in wall 13, a portion of the resilient disk 40 that also travels past the magnet 14 is urged against a corresponding back portion of the seed disk 20. When this occurs, the vacuum source to the individual plurality of seed apertures 21 is cut off thereby causing the individual seed to disengage from the seed aperture 21 and to exit through seed drop 11 to the ground for planting. After seed disk 20 is no longer in communication with magnet 14, the resilient disk 40 is drawn back toward nonmagnetic backing disk 50 as a result of a pressure difference created by the vacuum source through a plurality of vacuum apertures 54. As communication between the individual plurality of seed apertures 21 and the vacuum source is reestablished, a new seed is deposited at the seed aperture 21 as a result of the pressure differential.

Figure 2:
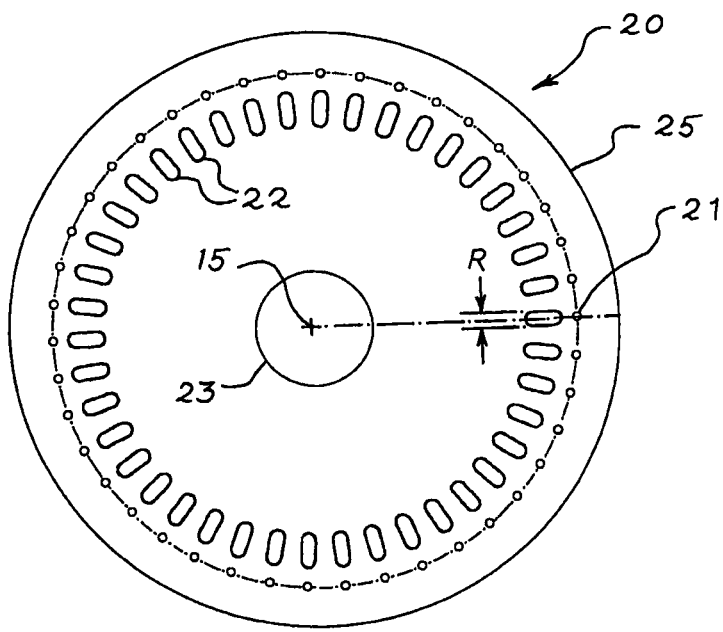
FIG. 2 is a front view of a seed disk of the seed meter assembly of FIG. 1.

As shown in FIGS. 2-4, the seed disk 20 is a circular disk having a central aperture 23 and a plurality of seed apertures 21 circumferentially spaced about edge 25. In the preferred embodiment, seed disk 20 is composed of wear resistant material such as aluminum, steel or plastic. Although dimensions of the seed disk 20 may vary depending on various different planting needs, in the preferred embodiment, it has a general thickness of 0.0757 inches and the diameter at edge 25 through central axis 15 is preferably 10.5 inches. In comparison, the diameter of central aperture 23 is not limited to the dimensions associated with the seed disk 20 but instead corresponds to the diameter of conduit 17. In the preferred embodiment, the diameter of central aperture 23 is approximately 2 inches.

The plurality of seed apertures 21 extend the entire width of seed disk 20 and are configured to hold seeds until disengagement occurs. The plurality of seed apertures 21 has a diameter of about 9 inches through the central axis 15. Preferably, the diameter of each of the plurality of seed apertures 21 permits seeds to easily engage the plurality of seed apertures 21. In one example, the diameter of each of the plurality of seed apertures is substantially the same and may be approximately 0.125 inches. Although the number of the plurality of seed apertures may vary depending on the dimensions and configurations of the seed meter assembly, in the preferred embodiment, the number of seed apertures 21 disposed at the seed disk 20 is 42.

Circumferentially aligned with the plurality of seed apertures 21 is a plurality of slots 22. The slots 22 provide a means of agitating seeds within the seed hopper. In some instances, the plurality of slots 22 may become blocked with loose debris. As each of the plurality of slots 22 rotate, they pass brush 12 which may remove any debris contained within the slot such as seed particles. In the preferred embodiment, the diameter of each of the plurality of slots 22 is approximately 0.25 inches and the length is approximately 0.64 inches. As shown in detail in FIG. 3, each slot 22 extends a depth into the seed disk 20 that is less than the width of the seed disk 20. The plurality of slots 22, therefore, do not extend through the entire width of seed disk 20. In the preferred embodiment, this depth distance for each of the plurality of slots 22 is approximately 0.11 inches. Each of the plurality of slots 22 is spaced a distance from each plurality of seed apertures 21. In the preferred embodiment, the slots 22 and seed apertures 21 are spaced a distance of approximately 0.20 inches.

The number, placement and dimension of the plurality of seed apertures and slots may vary depending on the type of seeds being planted and size of seed meter assembly without departing from the spirit of the invention.

As shown in FIGS. 5-6, the face plate 30 is a circular disk including edge 32, central aperture 33, and a plurality of mounting apertures 31. The diameter of face plate 30 from edge 32 to central axis 15 is approximately 3.75 inches. The thickness of face plate 30 in the preferred embodiment is approximately 0.1 inches. The plurality of mounting apertures 31 are circumferentially spaced about edge 32 and extend through the entire width of face plate 30. In the preferred embodiment, the diameter of the plurality of mounting apertures through central axis 15 is approximately 2.88 inches. In the preferred embodiment, the diameter of central aperture 33 is approximately 2 inches and generally corresponds with the diameter of conduit 17. These dimensions may vary without departing from the spirit of the invention.

Resilient disk member 40 shown in FIGS. 7-11 may be composed of three different layers. A first layer 42 and a second layer 45 are substantially identical, elastomeric and preferably composed of rubber. The first layer 42 includes a first edge 41 and a first central aperture 43. The second layer includes a second edge 46 and a second central aperture 47. A plurality of substantially magnetic portions 44 is disposed between first layer 42 and second layer 45. The first layer 42, the plurality of substantially magnetic portions 44, and the second layer 45 are bonded together or cured to form resilient disk member 40 by means known in the art. In the preferred embodiment, the diameters of first and second layers, 42 and 45, respectively, at first and second edges, 41 and 46, respectively, are approximately 10 inches. The diameter of first and second layers, 42 and 45, respectively, at first and second central apertures, 43 and 47, respectively is approximately 2 inches.

The number of the plurality of substantially magnetic portions 44 preferably equals the number of plurality of seed apertures 21 on seed disk 20. Each of the plurality of substantially magnetic portions 44 is arranged between first and second central apertures, 43 and 47, respectively, and first and second edge 41 and 46, respectively. In different embodiments, each of the plurality of substantially magnetic portions 44, as shown as single line 48 in FIG. 8, is composed of more than one magnetic portion. Various embodiments of single line 48 are shown in FIG. 9 through FIG. 11. As shown in FIG. 9, line 48 comprises three individual magnetic strips, 44*a*, 44*b* and 44*c*, wherein each strip extends from second central aperture 47 to second edge 46. As shown in FIG. 10, line 48 includes three individual magnetic strips, 44*d*, 44*e* and 44*f*, wherein only strip 44*e* extends all the way between second central aperture 47 and second edge 46. FIG. 11 is a representation of line 48 wherein it includes four individual magnetic strips, 44*g*, 44*h*, 44*i* and 44*j*, wherein each strip extends from second central aperture 47 to second edge 46. In a seed disk with approximately 42 individual seed apertures, the number of strips as shown as line 48 is preferably between three and four. The arrangement of strips as shown in FIGS. 9-11 is merely by way of example and other arrangements known in the art may suffice without departing from the spirit of the invention.

Figure 12:
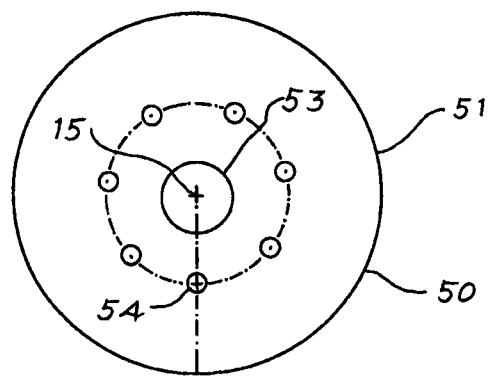
FIG. 12 is a front view of a substantially nonmagnetic backing disk of the seed assembly of FIG. 1.

The nonmagnetic backing member 50 is shown in FIG. 12 and includes central aperture 53, edge 51, and a plurality of vacuum apertures 54. The plurality of vacuum apertures 54 is circumferentially spaced around central axis 15 and between central aperture 53 and edge 51. The vacuum apertures 54 are used in maintaining the pressure differential associated with the seed meter assembly 100. At a time when magnet 14 is not magnetically coupled to the plurality of substantially magnetic portions 44, the vacuum apertures 54 provide a pressurization that urges the resilient disk member 40 away from the seed disk 20 toward the nonmagnetic backing disk 50. This movement permits the seeds to engage the plurality of seed apertures 21.

The nonmagnetic backing member 50 is preferably non-ferrous and its dimensions may vary without departing from the spirit of the invention. In the preferred embodiment, the diameter of nonmagnetic backing disk 50 at edge 51 may be substantially the same as the diameter of the resilient disk member 40, which is approximately 10 inches. Each of the plurality of vacuum apertures 54 may be disposed at a location equidistant from edge 51 and axis 15. These vacuum apertures 54 may have a diameter of approximately 0.5 inches whereas the diameter of the plurality of vacuum apertures 54 to the axis 15 may be approximately 5 inches. The diameter of central aperture 53 is approximately 2 inches.

Figure 13:
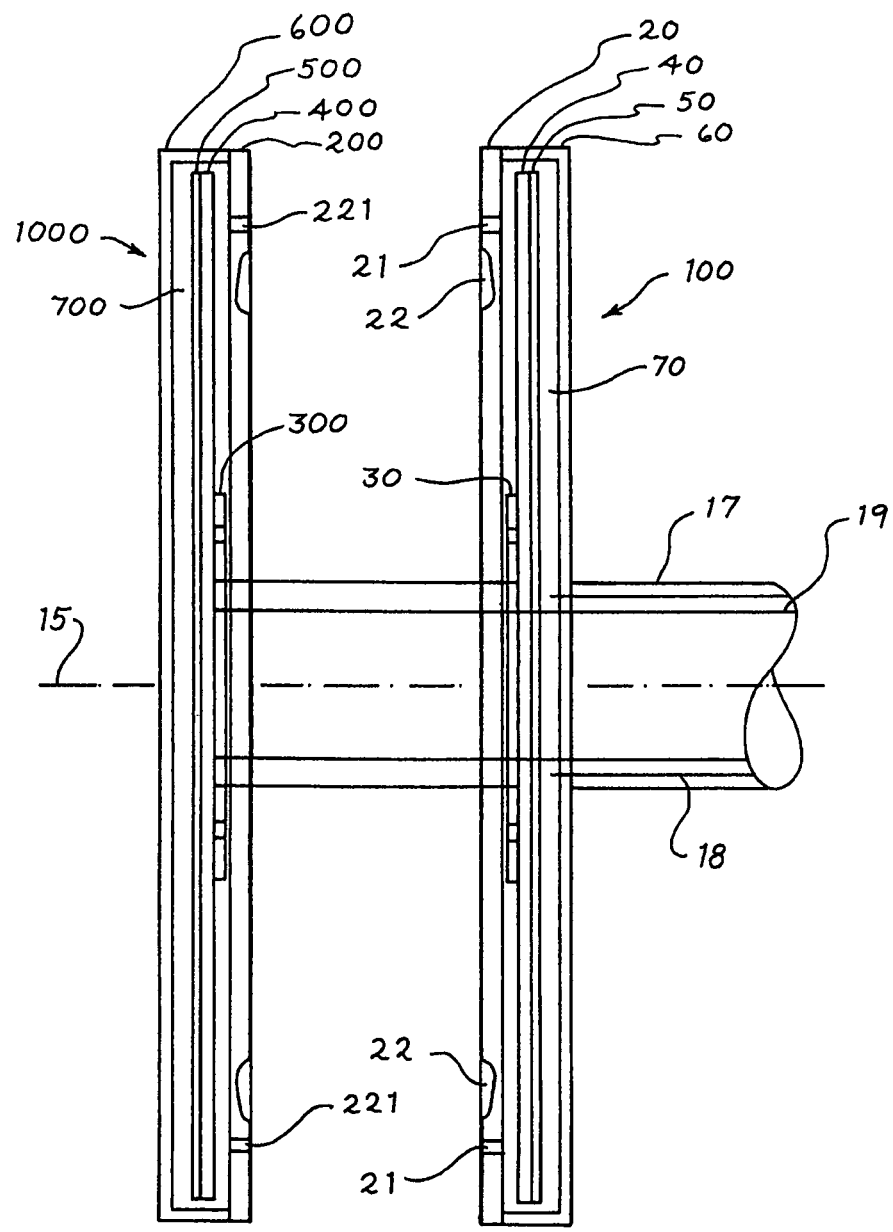
FIG. 13 is a side view of a vacuum seed meter in accordance with a preferred embodiment of the invention.

FIG. 13 shows a cut-through side view of the assembled components of a seed disk assembly. In this embodiment, the seed disk assembly comprises first seed meter assembly 100 and second seed meter assembly 1000. First seed meter assembly 100 and second seed meter assembly 1000 are rotatably mounted on conduit 17, wherein first seed meter assembly 100 and second seed meter assembly 1000 face each other. In the preferred embodiment, the first seed meter assembly 100 and second seed meter assembly 1000 are spaced approximately 2.25 inches from each other and the distance between the outer edges of first seed meter assembly 100 and second meter assembly 1000 is approximately 4 inches. In additional embodiments, first seed meter assembly 100 and second seed meter assembly 1000 may face away from each other when mounted on conduit 17.

The first seed meter assembly 100 includes a housing 60. Within housing 60, seed disk 20 is adjacent face plate 30, which is adjacent resilient disk member 40, which is adjacent nonmagnetic backing disk 50. Housing 60 secures these elements in the proper assembly about conduit 17. Face plate 30, resilient disk member 40 and nonmagnetic backing disk 50 are contained within inner chamber 70.

The dimensions of the first seed meter assembly 100 may vary depending on different configurations of the assembly. In the preferred embodiment, the width of first seed meter assembly 100 is approximately 0.83 inches. In the preferred embodiment, the width of seed disk 20 is approximately 0.19 inches and the distance between seed disk 20 and resilient disk member 40 is approximately 0.14 inches. As discussed before, however, this distance may vary during operation of the seed meter assembly. In the preferred embodiment, the width of resilient disk member 40 is approximately 0.13 inches and the width of nonmagnetic backing disk 50 is approximately 0.09 inches. In the preferred embodiment, the distance between nonmagnetic backing disk 50 and one end of inner chamber 70 is approximately 0.19 inches. In the preferred embodiment, the distance from the bottom of housing 60 and inner chamber 70 is approximately 0.10 inches. In the preferred embodiment, the distance from the bottom of inner chamber 70 and resilient disk member 40 and nonmagnetic backing disk 50 is approximately 0.13 inches.

Second seed meter assembly 1000 is assembled in a similar fashion as first seed meter assembly 100. Second seed meter assembly 1000 comprises second seed disk 200, second face plate 300, second resilient disk member 400, second nonmagnetic backing disk 500, and second housing 600. In the preferred embodiment, second seed disk 200 is similar to seed disk 20, second face plate 300 is similar to face plate 30, second resilient disk member 400 is similar to resilient disk member 40, second nonmagnetic backing disk 500 is similar to nonmagnetic backing disk 50, second housing 600 is similar to housing 60 and second inner chamber 700 is similar to inner chamber 70. Additionally, in the preferred embodiment, the components of second seed meter assembly 1000 are arranged in a similar fashion as first seed meter assembly 100. As such, the dimensions discussed above are similar for both first seed meter assembly 100 and second seed meter assembly 1000.

First vacuum tube 18 and second vacuum tube 19 reside within conduit 17 wherein second vacuum tube 19 is contained within first vacuum tube 18. First vacuum tube 18 and second vacuum tube 19 are connected to a vacuum source (not shown). When assembled, first vacuum tube 18 extends into inner chamber 70 and second vacuum tube 19 extends into second inner chamber 700. In the preferred embodiment, conduit 17, first vacuum tube 18 and second vacuum tube 19 are centered about central axis 15. In order to allow first vacuum tube 18 and second vacuum tube 19 to be in communication with inner chamber 70 and second inner chamber 700, respectively, conduit 17 may include apertures. In the preferred embodiment, the diameter of conduit 17 is approximately 2 inches. The diameter of both first vacuum tube 18 and second vacuum tube 19 may vary as long as a vacuum tight seal is created between first chamber 70 and second chamber 700, respectively.

Individual seeds are removed from the plurality of seed apertures 221 on second seed meter assembly 1000 through use of a magnet as described above in reference to first seed meter assembly 100.

The rotation of the seed meter assembly is controlled by a motor. In a preferred embodiment, an electric registry-type motor may be included. The registry motor allows the rotation of the seed meter assembly, and thus release of the individual seeds, to be finely and precisely controlled.

Figure 14:
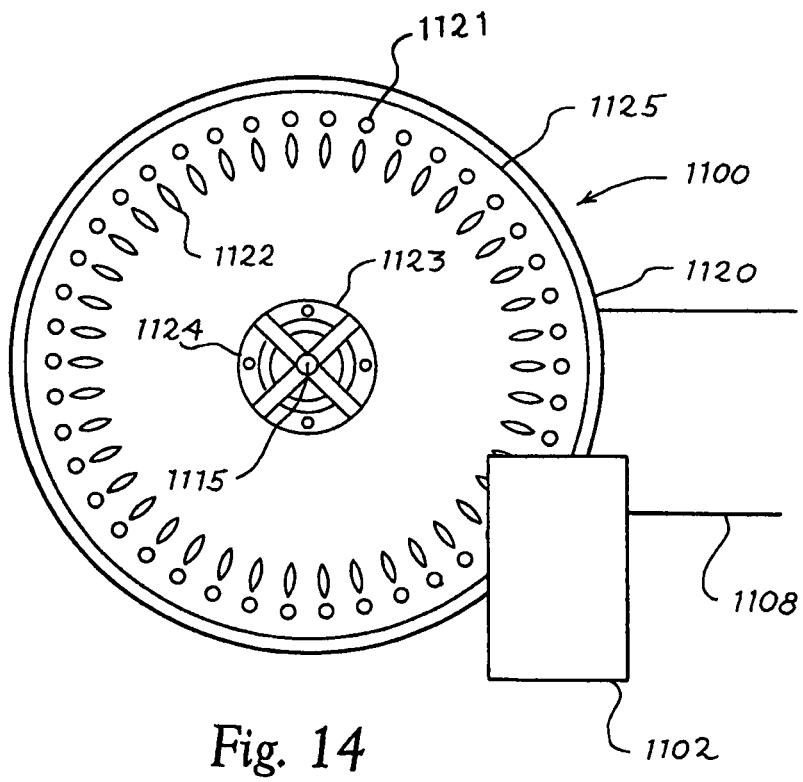
FIG. 14 is a schematic front elevational view of a vacuum seed meter in accordance with a preferred embodiment of the invention.
Figure 16:
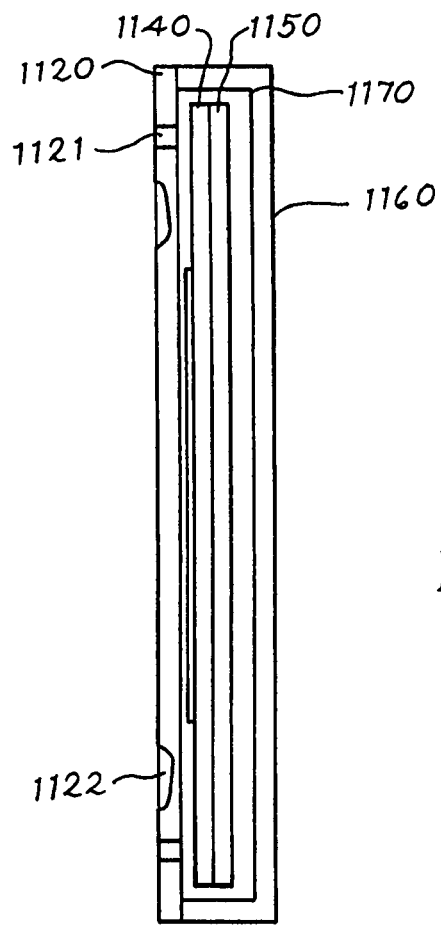
FIG. 16 is a side view of the vacuum seed meter assembly in accordance with a preferred embodiment of the invention.

A vacuum seed meter assembly 1100 in accordance with a preferred embodiment of the invention is shown in FIGS. 14-16. Vacuum seed meter assembly 1100 may include a seed disk 1120, a resilient disk member 1140, a nonmagnetic backing member 1150, a chamber 1170, and a stationary holder 1102 operably connected to one another. A housing 1160, associated with the seed meter assembly 1100, may include the seed disk 1120, the resilient disk member 1140, the nonmagnetic backing member 1150, and the chamber 1170. In some embodiments, the seed disk 1120 may be similar to seed disk 20 described in FIGS. 2-4, the nonmagnetic backing disk 1150 may be similar to nonmagnetic backing disk 50 described in FIG. 12, and the resilient disk member 1140 may be similar to resilient disk member 40 described in FIGS. 7-11. Vacuum seed meter assembly 1100 may be used in association with a variety of different planting units, which include a seed hopper and furrow. During use, the vacuum seed meter assembly 1100 rotates relative to the stationary holder 1102 having associated magnetic characteristics.

Stationary holder 1102 is spaced a distance from the housing 1160 but remains magnetically connectable with the resilient disk member 1140. Stationary holder 1102 has an interior edge 1105 having at least one magnet 1106 attached thereon. In one embodiment, stationary holder 1102 includes at least two magnets 1106 and 1107 disposed at the interior edge 1105. The at least two magnets 1106 and 1107 may be magnetically coupled to a magnetic portion associated with the resilient disk member 1140.

During use, the vacuum seed meter assembly 1100 rotates causing seeds 1101 to engage the seed disk 1120 against a plurality of seed apertures 1121. In one embodiment, seeds may be dropped from a furrow through a seed inlet for disposal at the plurality of seed apertures 1121. As the seed meter assembly 1100 rotates, a vacuum is created within inner chamber 1170 thereby causing a pressure difference between inner chamber 1170 and the exterior of the seed disk 1120. This pressure difference urges the individual seeds against a plurality of seed apertures 1121. As the seed disk 1120 travels past magnets 1106 and 1107, a portion of the resilient disk member 1140 that also travels past the magnets is urged against a corresponding back portion of the seed disk 1120. When this occurs, the vacuum source to the individual plurality of seed apertures 1121 is cut off thereby causing the individual seed to release from the corresponding seed aperture 1121. After release, the seed may exit the seed meter assembly 1100 where it may be used for planting. After the seed disk 1120 is no longer in communication with magnets 1106 and 1107, the resilient disk member 1140 is drawn back toward the nonmagnetic backing disk 1150 as a result of a pressure differential created by the vacuum source through a plurality of vacuum apertures 54. Moreover, the communication between the individual plurality of seed apertures 1121 and vacuum source is reestablished and a new seed is deposited against the seed aperture as a result of the pressure differential The seed disk 1120 as shown in FIGS. 14-15 is a circular disk having a central aperture 1123 covered by plate 1124 and a plurality of seed apertures 1121 circumferentially spaced about edge 1125. In the preferred embodiment, seed disk 1120 is composed of wear resistant material such as aluminum, plastic or nonferrous material. Although dimensions of the seed disk 1120 may vary depending on various different planting needs, in the preferred embodiment, it has a general thickness of 0.0757 inches and the diameter at edge 1125 through central axis 1115 is preferably 10.5 inches. In comparison, the diameter of central aperture 1123 is not limited to the dimensions associated with the seed disk 1120 but instead is determined by the size of the diameters of other corresponding central apertures as well as the rotational shaft used to drive the assembly. In the preferred embodiment, the diameter of central aperture 1123 is approximately 2 inches.

The plurality of seed apertures 1121 extend the entire width of seed disk 1120 and are configured to hold seeds until disengagement occurs. The plurality of seed apertures 1121 has a diameter of about 9 inches through the central axis 1115. Preferably, the diameter of each of the plurality of seed apertures 1121 permits seeds to easily engage the plurality of seed apertures. In one example, the plurality of seed apertures 1121 is substantially the same and may be approximately 0.125 inches. Although the number of the plurality of seed apertures may vary depending on the dimensions and configurations of the seed meter assembly, in the preferred embodiment, the number of seed apertures 1121 disposed at the seed disk 1120 is 42.

Circumferentially aligned with the plurality of seed apertures 1121 is a plurality of slots 1122. The slots 1122 provide a means of agitating seeds within the seed hopper. In the preferred embodiment, the diameter of each of the plurality of slots 1122 is approximately 0.25 inches and the length is approximately 0.64 inches. Similar to the example shown in FIG. 3, each slot 1122 extends a depth into the seed disk 1120 that is less than the width of the seed disk 1120. The plurality of slots 1122, therefore, do not extend through the entire width of seed disk 1120. In the preferred embodiment, this depth distance for each of the plurality of slots 1122 is approximately 0.11 inches. Each of the plurality of slots 1122 is spaced a distance from each plurality of seed apertures 1121. In the preferred embodiment, the slots 1122 and seed apertures 1121 are spaced a distance of approximately 0.20 inches.

The number, placement and dimension of the plurality of seed apertures and slots may vary depending on the type of seeds being planted and size of seed meter assembly without departing from the spirit of the invention.

Figure 17:
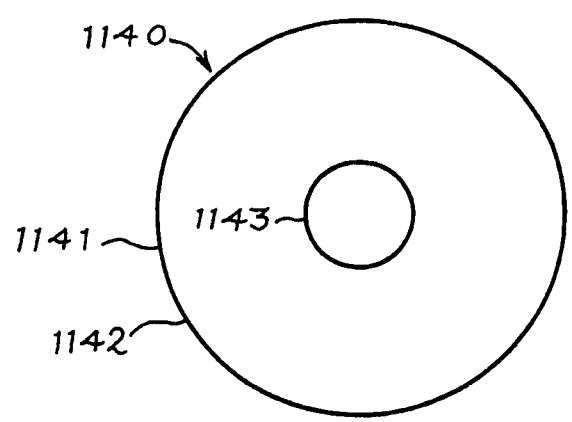
FIG. 17 is a front view of a resilient disk member of the seed meter assembly of FIG. 14.
Figure 19:
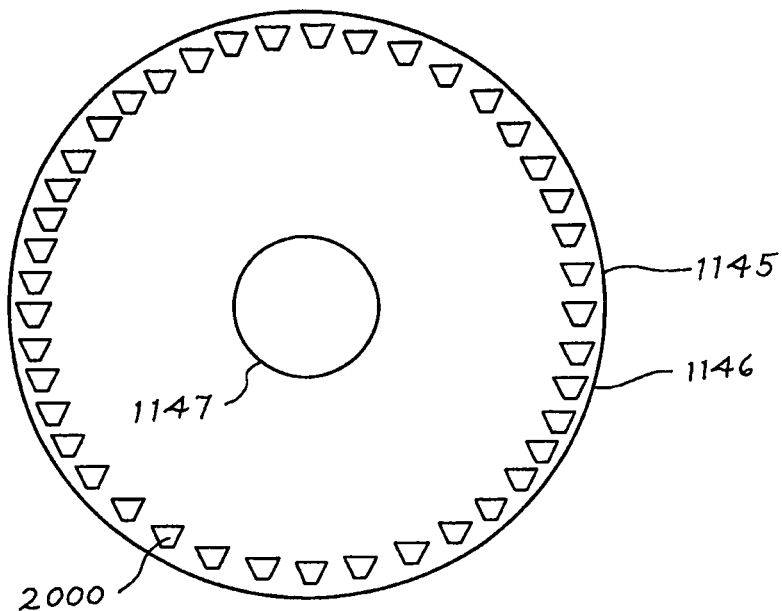
FIG. 19 is a front view of an internal portion of the resilient disk member of FIG. 17.

Resilient disk member 1140 shown in FIGS. 17-19 may be composed of three different layers. A first layer 1142 and a second layer 1145 are substantially identical, elastomeric and preferably composed of rubber. The first layer 1142 includes a first edge 1141 and a first central aperture 1143. The second layer includes a second edge 1146 and a second central aperture 1147. A plurality of substantially magnetic portions 2000 is disposed between the first layer 1142 and the second layer 1145. First layer 1142, the plurality of substantially magnetic portions 2000, and second layer 1145 are bonded together or cured to form resilient disk member 1140 by means known in the art. The diameter of first and second layers, 1142 and 1145, respectively, at first and second edges, 1141 and 1146, respectively, are approximately 10 inches. The diameter of first and second layers, 1142 and 1145, respectively, at first and second central apertures, 1143 and 1147, respectively is approximately 2 inches.

In one embodiment, each individual magnet portion 2000 includes a top edge 2010, bottom edge 2020, a first side edge 2030, and a second side edge 2040. Both the top edge 2010 and bottom edge 2020 have notches 2060 and 2050 that may be used during the manufacturing process. The number of substantially magnetic portions 2000 preferably equals the number of plurality of seed apertures 1121 on seed disk 1120. Each of the plurality of substantially magnetic portions 2000 is arranged between first and second central apertures, 1143 and 1147, respectively, and first and second edge 1141 and 1146, respectively. The arrangement of magnets as shown in FIGS. 18-19 is merely by way of example and other arrangements known in the art may suffice without departing from the spirit of the invention.

The substantially magnetic portions 2000 and magnets 1106 and 1107 of the stationary holder 1102 may be coupled via a magnetic force. During rotation of the resilient disk member 1140, the substantially magnetic portions 2000 may align with magnets 1106 or 1107. During alignment, the attractive magnetic force between magnets 1106 or 1107 and at least one of the substantially magnetic portions 2000 causes the resilient disk member 1140 to move toward the stationary holder 1102. This movement may cause the resilient disk member 1140 to abut against a back side of the seed disk 1120 so as to occlude the plurality of seed apertures 1121. This occlusion causes a brief disruption of suction force being applied to the seeds 1101 thereby causing them to disengage from the seed apertures 1121 and the seed disk 1120.

Figure 21:
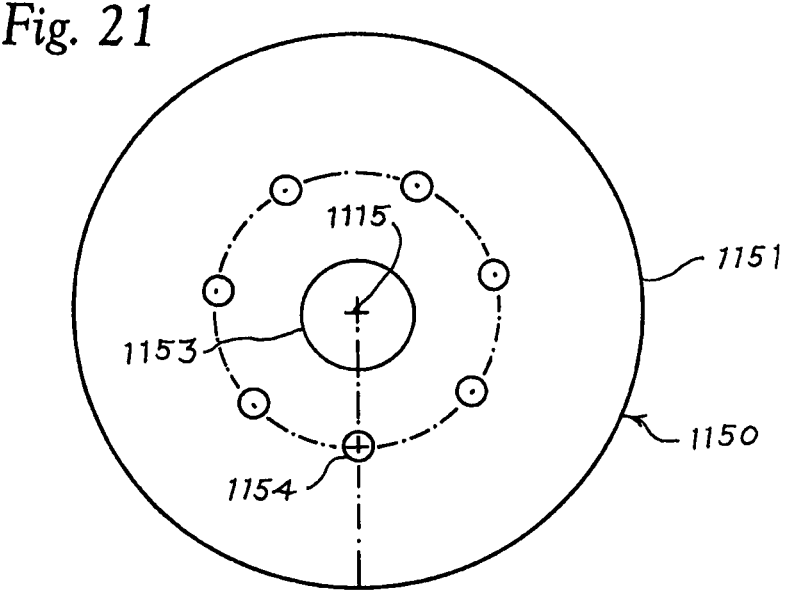
FIG. 21 is a front view of a substantially nonmagnetic backing disk of the seed assembly of FIG. 14.

The nonmagnetic backing member 1150 is shown in FIG. 21 and includes central aperture 1153, edge 1151, and a plurality of vacuum apertures 1154. The plurality of vacuum apertures 1154 is circumferentially spaced around central axis 1115 and between central aperture 1153 and edge 1151. The vacuum apertures 1154 are used in maintaining the pressure differential associated with the seed meter assembly 1100. At a time when stationary holder magnets 1106 and 1107 are not magnetically coupled to the plurality of magnetic portions 2000, the vacuum apertures 1154 provide a pressurization that urges the resilient disk member 1140 away from the seed disk 1120 toward the nonmagnetic backing disk 1150. This movement permits the seeds to engage the plurality of seed apertures 1121.

The nonmagnetic backing member 1150 is preferably nonferrous and its dimensions may vary without departing from the spirit of the invention. In the preferred embodiment, the diameter of nonmagnetic backing disk 1150 at edge 1151 may be substantially the same as the diameter of the resilient disk member 1140, which is approximately 10 inches. Each of the plurality of vacuum apertures 1154 may be disposed at a location equidistant from edge 1151 and axis 1115. These vacuum apertures 1154 may have a diameter of approximately 0.5 inches whereas the diameter of the plurality of vacuum apertures 1154 to the axis 1115 may be approximately 5 inches. The diameter of central aperture 1153 is approximately 2 inches.

Pressurization of the vacuum seed meter assembly 1100 may include any method generally known in the art. In one example, the seed meter assembly 1100 shown in FIG. 15 may be connected to a vacuum chamber 1110 and a vacuum source by a vacuum connector 1108 to create the pressure differential in the housing 1160. The configuration of the vacuum chamber 1110 and the vacuum source may be of the type generally known in the art.

A rotational shaft may connect to the housing 1160 and be configured to rotate the seed disk 1120. In one embodiment, at least one bearing may be operably connected to the rotational shaft to effect rotation of the seed disk 1120. In one embodiment, the rotational shaft is connected to central aperture 1123 of the seed disk, first central aperture 1143 and second central aperture 1147 of the resilient disk member 1140, and central aperture 1153 of the nonmagnetic backing disk 1150. This configuration permits the rotational shaft to rotate the vacuum seed meter assembly 1100.

The rotational shaft may be driven by any known means in the art. In one example, the rotation of the seed meter assembly is controlled by a motor. In a preferred embodiment, an electric registry-type motor may be included. The registry motor allows the rotation of the seed meter assembly, and thus release of the individual seeds, to be finely and precisely controlled. In another example, the external vacuum source is not only used to create the pressure differential within the housing, but is also operably connected and configured to drive the rotation of the rotational shaft as is generally known in the art.

What is claimed is:

1. A rotatable disk assembly for a seed meter to dispense individual seeds, the rotatable disk assembly comprising:
    a housing comprising a seed disk and defining an interior portion, the interior portion of the housing being in operable communication with a vacuum source, the seed disk including a plurality of circumferentially spaced seed apertures about a periphery thereof, wherein the plurality of seed apertures are operatively connected to the vacuum source;
    a substantially nonmagnetic backing disk member disposed within the housing and in communication with the vacuum source and defining a plurality of vacuum apertures on a first surface thereof; and
    a resilient disk member adjacent to the nonmagnetic backing disk at the first surface, comprising a plurality of magnetic portions wherein at least one of the plurality of magnetic portions is engageable with at least one of the plurality of spaced seed apertures of the seed disk when engaged with a magnetic source, and the at least one of the plurality magnetic portions configured to occlude the seed aperture and to disrupt communication between the at least one seed aperture and the vacuum source.

2. The rotatable disk assembly of claim 1, wherein the housing defines a central axis and the interior portion communicates with the vacuum source by way of a conduit disposed about the central axis.

3. The rotatable disk assembly of claim 1, wherein the resilient disk member comprises an elastomeric disk and the magnetic portions comprise magnetically attractable portions embedded within the elastomeric disk.

4. The rotatable disk assembly of claim 3, wherein the elastomeric disk comprises a pair of elastomeric disk members having magnetically attractable metal strips sandwiched between the pair of elastomeric disk members, each of the metal strips having a first end and a second end wherein each of the metal strips extends radially outward from the first end to the second end.

5. The rotatable disk assembly of claim 4, wherein the at least one magnetic portion comprises 3 to 5 metal strips.

6. The rotatable disk assembly of claim 1, further comprising:
    a second housing including a second seed disk and defining an interior portion in operable communication with the vacuum source, the second seed disk defining a plurality of circumferentially spaced seed apertures about a periphery thereof, wherein the plurality of seed apertures are operatively connected to the vacuum source;
    a second substantially nonmagnetic backing disk member disposed within the second housing and in communication with the vacuum source and defining a plurality of vacuum apertures on a first surface thereof; and
    a second resilient disk member adjacent to the second nonmagnetic backing disk at the first surface, the second resilient disk member comprising a plurality of magnetic portions wherein at least one of the plurality of magnetic portions is engageable with at least one of the plurality of spaced seed apertures of the seed disk when engaged with a magnetic source, and the at least one of the plurality magnetic portions configured to occlude the seed aperture and to disrupt communication between the at least one seed aperture and the vacuum source.

7. The rotatable disk assembly of claim 6, wherein the seed disk of the housing and the seed disk of the second housing are opposite to and facing each other.

8. The rotatable disk assembly of claim 1, wherein backing disk member and the resilient disk member are of substantially the same diameter.

9. The rotatable disk assembly of claim 1, further comprising a face plate adjacent to the resilient disk member and positioned between the seed disk and the resilient disk.

10. A seed meter disk assembly for dispensing individual seeds, the seed meter disk assembly comprising:
    a housing having a seed disk portion and defining an interior portion, the interior portion of the housing being in operable communication with a vacuum source, the seed disk portion defining a plurality of seed apertures about a periphery thereof, wherein the plurality of seed apertures are operatively connected to the vacuum source;
    a substantially nonmagnetic backing disk member disposed within the housing and in communication with the vacuum source and defining at least one vacuum aperture on a first surface thereof; and
    a resilient disk member adjacent to the nonmagnetic backing disk member on the first surface, the resilient disk member comprising a plurality of magnetic portions wherein at least one of the plurality of magnetic portions is engageable with at least one of the plurality of spaced seed apertures of the seed disk when activated by a magnetic source such that the communication between the at least one seed aperture and the vacuum source is disrupted.

11. The disk assembly of claim 10, wherein the housing defines a central axis and the interior portion communicates with the vacuum source by way of a conduit disposed about the central axis.

12. The rotatable disk assembly of claim 10, wherein the resilient disk member comprises an elastomeric disk and the magnetic portions comprise magnetically attractable portions embedded within the elastomeric disk.

13. The rotatable disk assembly of claim 12, wherein the elastomeric disk comprises a pair of elastomeric disk members having magnetically attractable metal strips sandwiched between the pair of elastomeric disk members, each of the metal strips having a first end and a second end wherein each of the metal strips extends radially outward from the first end to the second end.

14. The rotatable disk assembly of claim 12, wherein the at least one magnetic portion comprises 3 to 5 metal strips.

15. The rotatable disk assembly of claim 10, further comprising:
a second housing including a second seed disk portion and defining an interior portion in operable communication with the vacuum source, the second seed disk portion defining a plurality of seed apertures about a periphery thereof, wherein the plurality of seed apertures are operatively connected to the vacuum source;
a second substantially nonmagnetic backing disk member disposed within the second housing and in communication with the vacuum source and defining a plurality of vacuum apertures on a first surface thereof; and
a second resilient disk member adjacent the second nonmagnetic backing disk at the first surface, the second resilient disk member comprising a plurality of magnetic portions wherein at least one of the plurality of magnetic portions is engageable with at least one of the plurality of spaced seed apertures of the seed disk when activated by a magnetic source such that communication between the at least one seed aperture and the vacuum source is disrupted.

16. The rotatable disk assembly of claim 15, wherein the seed disk portion of the housing and the seed disk portion of the second housing are opposite to and facing each other.

17. The rotatable disk assembly of claim 10, wherein backing disk member and the resilient disk member are of substantially the same diameter.

18. The rotatable disk assembly of claim 10, further comprising a face plate adjacent to the resilient disk member and positioned between the seed disk and the resilient disk.

* * * * *